(12) United States Patent
Durst (10) Patent No.: US 7,684,414 B2
(45) Date of Patent: Mar. 23, 2010

(54) SYSTEM AND METHOD FOR USING PERFORMANCE ENHANCING PROXIES WITH IP-LAYER ENCRYPTORS

(75) Inventor: Robert C. Durst, Oakton, VA (US)

(73) Assignee: The MITRE Corporation, McLean, VA (US)

(*) Notice: Subject to any disclaimer, the term of this patent is extended or adjusted under 35 U.S.C. 154(b) by 600 days.

(21) Appl. No.: 11/359,541

(22) Filed: Feb. 23, 2006

(65) Prior Publication Data
US 2006/0256817 A1   Nov. 16, 2006

Related U.S. Application Data

(60) Provisional application No. 60/677,336, filed on May 4, 2005.

(51) Int. Cl.
*H04L 12/28* (2006.01)
(52) U.S. Cl. ..................................................... 370/400
(58) Field of Classification Search ................. 370/400, 370/338; 709/219, 228
See application file for complete search history.

(56) References Cited

U.S. PATENT DOCUMENTS

| | | | | | |
|---|---|---|---|---|---|
| 6,594,246 | B1* | 7/2003 | Jorgensen | .................. | 370/338 |
| 2002/0023210 | A1* | 2/2002 | Tuomenoksa et al. | ....... | 713/161 |
| 2003/0131263 | A1* | 7/2003 | Keane et al. | ................. | 713/201 |
| 2005/0076099 | A1* | 4/2005 | Wang et al. | ................. | 709/219 |
| 2006/0059265 | A1* | 3/2006 | Keronen | ..................... | 709/228 |
| 2006/0256817 | A1* | 11/2006 | Durst | ......................... | 370/466 |

OTHER PUBLICATIONS

Border et al., *Performance Enhancing Proxies Intended to Mitigate Link-Related Degradations*, Network Working Group Informational Email, The Internet Society, 41 pgs, Jun. 2001.

* cited by examiner

Primary Examiner—Ayaz R Sheikh
Assistant Examiner—Hai-Chang Hsiung
(74) Attorney, Agent, or Firm—Sterne, Kessler, Goldstein & Fox PLLC (57) ABSTRACT

A mechanism to allow hosts on the plaintext side of IP-layer encryptors to utilize Performance Enhancing Proxies (PEPs) on the ciphertext side of IP-layer encryptors is provided. Two processes are utilized for each IP-layer encryptor to extend a higher-level protocol (as represented, for example, by OSI layers 4-7) from the plaintext or red-side of the IP-layer encryptor to the ciphertext or black-side of the IP-layer encryptor. These two processes are known as the red-side Performance Enhancing Proxy Enabler (PEPE) and the black-side PEPE. The red-side and black-side PEPEs of a local IP-layer encryptor work together with red-side and black-side PEPEs of a remote IP-layer encryptor to transmit packets between the IP-layer encryptors using a higher-level protocol. Hence, PEPEs allow packets exchanged by red-side hosts separated by IP-layer encryptors to be transmitted on the black-side using a higher-level protocol. Therefore, PEPEs allow hosts on the red-side to take advantage of PEPs on the black-side.

30 Claims, 6 Drawing Sheets

SYSTEM AND METHOD FOR USING PERFORMANCE ENHANCING PROXIES WITH IP-LAYER ENCRYPTORS

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. DAAB07-03-C-N206 awarded by the United States Army.

BACKGROUND OF THE INVENTION

1. Field of the Invention

The present invention relates generally to IP networking and specifically to providing a mechanism to allow packets transformed by IP-layer encryptors to benefit from Performance Enhancing Proxies (PEPs).

2. Background Art

Hosts can communicate across the Internet by sending and receiving packets to each other. As packets travel from one host to another through the Internet, they may travel through various routers, proxies, and other network devices. Some of these network devices include satellite transmission systems to transport packets utilizing satellite communications and encryptors to securely transmit packets over public or insecure areas of the network. Network devices often operate transparently from the end hosts so that the end hosts are unaware of their presence. By operating transparently, network devices can be added and removed without requiring any modifications to the end hosts.

One type of a network device is a Performance Enhancing Proxy (PEP). Performance Enhancing Proxies attempt to overcome short comings that an existing reliable transport protocol, such as TCP, may suffer in certain challenged environments. For example, TCP operates poorly over satellite connections because TCP is not tuned for high bandwidth and large delays that are characteristic of satellite communications. To alleviate these performance problems, a PEP can be deployed at both ends of a satellite connection to intercept TCP connections that wish to pass through the satellite connection. Once the PEPs intercept a TCP connection, they use an alternative protocol that is more suitable for satellite communication to transmit the data in the intercepted TCP connection over the satellite. Furthermore, PEPs manage the TCP connection on both ends of the satellite connection so that the end hosts are unaware that either the PEPs or an alternative protocol is being employed in the interim. Since the alternative protocol is more suitable than TCP for satellite communications, the over-all end-to-end performance that is experienced by the two end hosts are enhanced compared to a TCP connection that is run directly over the satellite link.

Another type of a network device is an IP-layer encryptor. IP-layer encryptors are deployed to provide secure communications between two or more private networks that are separated by a public or insecure network. When a packet in a private network attempts to enter the public network, an IP-layer encryptor intercepts and encrypts the packet before allowing the packet to pass to the public network. When a packet from a public network attempts to enter a private network, an IP-layer encryptor intercepts and decrypts the packet and allows only authenticated packets to enter the private network. Hence, IP-layer encryptors allow private networks to maintain security when hosts in the private networks communicate with each other over a public or insecure network. Often, the side of an IP-layer encryptor that interfaces the public or insecure network is referred to as the black-side or ciphertext side of the IP-layer encryptor and the opposite side of the IP-layer encryptor that interfaces a network to be protected from the public network is referred to as the red-side or plaintext side of the IP-layer encryptor.

Unfortunately, IP-layer encryptors tend to make PEPs, on the black-side, inoperative for communications initiated by hosts on the red-side of the IP-layer encryptors. When IP-layer encryptors encrypt red-side packets into black-side packets, they produce simple IP packets that do not contain any higher-level protocol information. IP-layer encryptors effectively hide, from the black-side, any information related to higher-level protocols that are being used by the corresponding red-side packets. Since PEPs operate only on packets containing higher-level protocol information, black-side packets produced by IP-layer encryptors cannot take advantage of black-side PEPs. Therefore, even if a red-side packet was originally utilizing a higher-level protocol, its corresponding black-side packet cannot take advantage of black-side PEPs.

Therefore, what is needed is a mechanism to allow red-side packets that flow through IP-layer encryptors to take advantage of black-side PEPs.

BRIEF SUMMARY OF THE INVENTION

The present invention provides a mechanism to allow hosts on the red-side of an IP-layer encryptor to take advantage of Performance Enhancing Proxies (PEPs) on the black-side of the IP-layer encryptor. For each IP-layer encryptor, the present invention utilizes two processes, one on the red-side and another the black-side of the IP-layer encryptor, to facilitate PEPs on the black-side of IP-layer encryptors. These processes are referred to as red-side PEPE (Performance Enhancing Proxy Enabler) and black-side PEPE.

When a host on the red-side of a local IP-layer encryptor attempts to send a packet to another host on the red-side of a remote IP-layer encryptor across a public or an insecure network, the local red-side PEPE intercepts the packet before it reaches the local IP-layer encryptor. If the packet contains higher-level protocol information, for example as represented by Open System Interconnection (OSI) layers 4-7 such as TCP and SCTP, the local red-side PEPE encapsulates the higher-level protocol information along with the data payload into a UDP packet and forwards it to the local IP-layer encryptor. Once the local IP-layer encryptor encrypts the UDP packet and outputs an IP packet, the local black-side PEPE intercepts the IP packet and transmits the IP packet to the remote IP-layer encryptor using a higher-level protocol such as TCP.

At the remote IP-layer encryptor, another set of black-side PEPE and red-side PEPE perform the revere transformation. The remote black-side PEPE intercepts the higher-level protocol used by the local black-side PEPE and receives the IP packet produced by the local IP-layer encryptor. The IP packet is forwarded to the remote IP-layer encryptor which decrypts the IP packet to reproduce the UDP packet created by the local red-side PEPE. The remote red-side PEPE intercepts the reproduced UDP packet and reconstructs the higher-level protocol used in the original red-side packet to transmit the packet from the remote red-side PEPE to the destination host. Packets from the remote host to the local host follow a similar path in the reverse order.

Since the IP packets produced by the local and remote IP-layer encryptors are transmitted using a higher-level protocol through the black-side PEPEs, the performance of the transmission between the two IP-layer encryptors may be enhanced by PEPs that exist between them. Therefore, the overall end-to-end performance between the local and remote host are enhanced.

Various coordination techniques between red-side and black-side PEPEs and between local and remote PEPEs are utilized to provide additional features and efficiencies. For example, the local red-side PEPE and the remote red-side PEPE support a basic NACK (negative acknowledgement) scheme to provide reliability for UDP packets that are transmitted through the IP-layer encryptors. In addition, a red-side PEPE can set a flag in the UDP packet to indicate whether its corresponding black-side PEPE should transport the encrypted packet using a higher-level protocol. In this manner, a red-side PEPE can selectively apply the overhead of the PEPEs for only the red-side packets that might benefit from PEPs on the black-side.

Furthermore, if the local PEPEs determine that remote PEPEs are unavailable at a remote IP-layer encryptor, the local PEPEs allow packets for the remote destination to pass through the local PEPEs unaffected. Hence, when a remote IP-layer encryptor does not have PEPEs, the local PEPEs allow the local IP-layer encryptor to interact with the remote IP-layer encryptor without any intervention by the PEPEs. Hence, PEPEs can be installed incrementally on IP-layer encryptors. As PEPEs are installed on additional remote IP-layer encryptors, the local PEPEs can interact with the new remote PEPEs to facilitate the use of PEPs in between the IP-layer encryptors.

A red-side PEPE may also provide flow-id information for a UDP packet to indicate to the black-side PEPE that the corresponding encrypted packet belongs to a particular flow. Using this information, the black-side PEPE can transport the encrypted packets in separate flows to enhance throughput and flow-control.

In order for a red-side PEPE and a black-side PEPE to communicate across an IP-layer encryptor, some bypass mechanism must be supported to allow the red-side and black-side PEPEs to exchange information without having the information be encrypted or decrypted. This bypass mechanism may be supported directly by the IP-layer encryptor or through a different channel that is independent of the IP-layer encryptor. As would be appreciated by one skilled in the relevant art, different bypass mechanisms may be utilized including packet based communications, serial communications, and communications using shared memory when the red-side and black-side PEPEs reside on a single computer.

A red-side PEPE and a black-side PEPE may be installed together with an IP-layer encryptor on the same machine or on several machines. If the PEPEs are installed on separate machines, they should be located in close proximity to minimize latency and to provide greater security if a bypass mechanism is in place across the IP-layer encryptor between the red-side and black-side PEPEs.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

1. IP-layer Encryptors (Prior Art)

Figure 1:
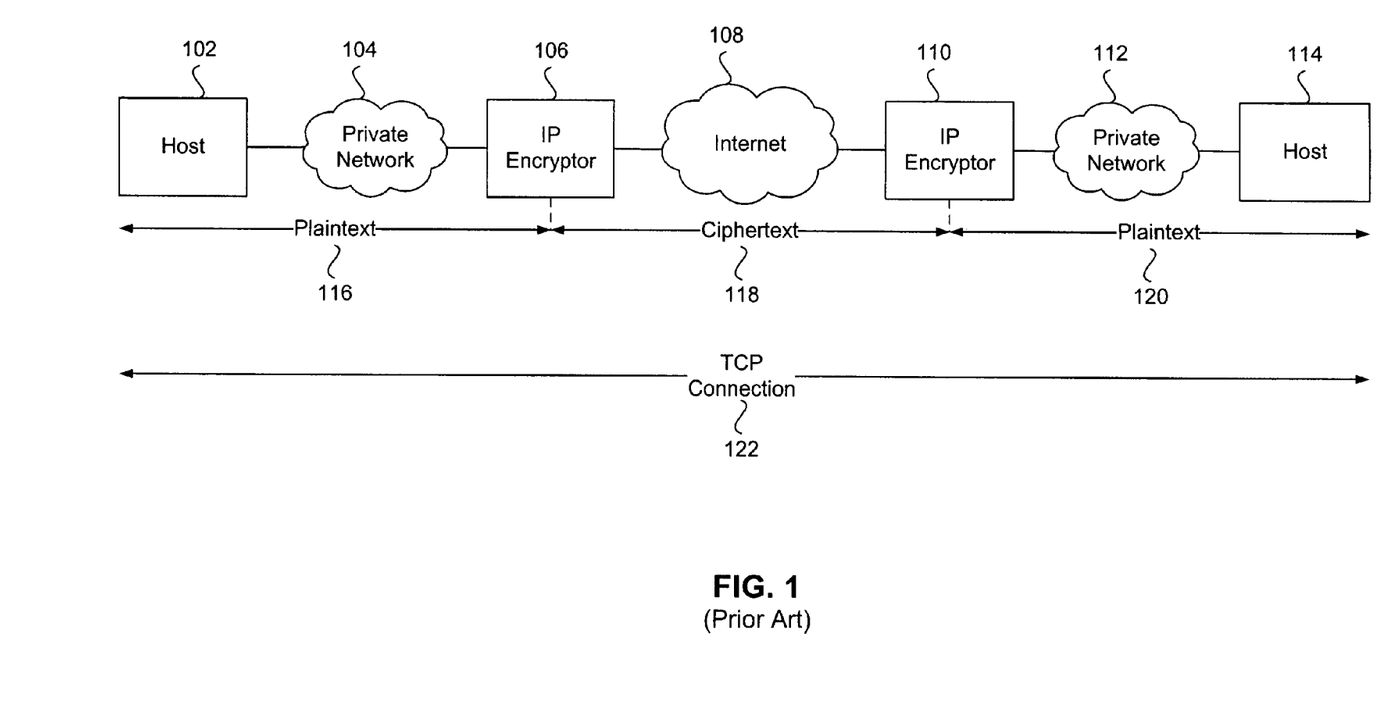
FIG. 1 is an exemplary illustration of IP-layer encryptors deployed to enable secure transmissions over an insecure or public network.

FIG. 1 is an exemplary illustration of IP-layer encryptors deployed to enable secure transmissions over an insecure or public network. Host 102 is a member of the private network 104. Private network 104 is connected to the Internet 108 through IP-layer encryptor 106. Host 114 is a member of the private network 112, which is connected to the Internet 108 through IP-layer encryptor 110. Internet 108 is an example of an insecure public network. IP-layer encryptors 106 and 110 provide secure transmissions between private networks 104 and 112 over the Internet 108.

Private networks 104 and 112 and the Internet 108 are packet-based networks that can be represented, for example, by the Open System Interconnection (OSI) 7 layer reference model. Hosts in these networks communicate with each other by exchanging, for example, Internet Protocol (IP) packets at OSI layer 3 over links represented by OSI layers 1 and 2. Furthermore, hosts in these networks may utilize a higher-level protocol at OSI layers 4-7, such as TCP, to manage flow control or error recovery of packets.

An IP-layer encryptor logically partitions a network into a red-side and a black-side and is responsible for securely passing packets between the red-side and the black-side. The red-side of the IP-layer encryptor interfaces a private network that is considered to need protection from the black-side of the IP-layer encryptor, which interfaces a public or insecure network. Packets received from the red-side of the IP-layer encryptor are generally encrypted before being allowed to pass through to the black-side. Packets received from the black-side of the IP-layer encryptor are generally decrypted and authenticated before being allowed to pass through to the red-side. IP-layer encryptors are typically configured to encrypt and decrypt all packets that it receives.

IP-layer encryptors 106 and 110 in FIG. 1 are deployed so that the private networks 104 and 112, which include hosts 102 and 114, are on the red-sides 116 and 120 of the IP-layer encryptors 106 and 110 and the insecure public Internet 108 is on the black-side 118 of the IP-layer encryptors 106 and 110. Often, the term plaintext is also used to reference the red-side of IP-layer encryptors and indicates that packets do not contain information encrypted by an IP-layer encryptor. In addition, the term ciphertext is used to reference the black-side of IP-layer encryptors and indicates that packets may contain information that is encrypted by an IP-layer encryptor. Hence, packets that travel through an IP-layer encryptor are in plaintext while on the red-side of the IP-layer encryptor and are in ciphertext while on the black-side of the IP-layer encryptor.

As deployed in FIG. 1, a packet that traverses from host 102 to 114 is initially in plaintext and on the red-side of IP-layer encryptor 106. When the packet attempts to enter Internet 108, the IP-layer encryptor 106 intercepts the packet, encrypts it, and forwards the encrypted packet towards host 114 through the Internet 108. The packet is routed through the Internet 108 in ciphertext. When the packet attempts to enter private network 112, IP-layer encryptor 110 intercepts, decrypts and authenticates the packet before it forwards the packet to the private network 112. The packet traverses the private network 112 as plaintext before arriving at host 114. Labels 116, 118 and 120 indicate the state in which the packet exists as it is transmitted between hosts 102 and 114.

IP-layer encryptors 106 and 110 may operate either in transport mode or tunnel mode. In transport mode, everything in the original packet is encrypted except for the original IP packet header. Hence, as the packet traverses the Internet 108, other hosts (not shown) in the Internet 108 may view the original IP header and obtain IP information related to hosts 102 and 114. In tunnel mode, the entire original packet including the original IP packet header is encrypted and a new IP packet header is generated for transmission of the packet in the Internet 108. The new IP packet header is generated using IP information related to the IP-layer encryptors 106 and 110. Hence, as the packet traverses the Internet 108, other hosts (not shown) in the Internet 108 can only discover IP information related to the IP-layer encryptors and IP information related to hosts 102 and 114 are hidden.

Regardless of whether an IP-layer encryptor operates in transport mode or tunnel mode, an IP-layer encryptor always encrypts the contents of a packet at OSI layers 4-7. Hence, when an IP-layer encryptor converts a plaintext packet into ciphertext packet, the resulting ciphertext packet contains only OSI layer 3 information and information relating to other higher-level protocols such as TCP in the original packet are not visible in the resulting ciphertext packet.

For example, when host 102 and host 104 establish a TCP connection as indicated by label 122, the data in the TCP connection is transported between host 102 and IP-layer encryptor 106 and between host 114 and IP-layer encryptor 110 as TCP/IP packets in plaintext. But, when the data in the TCP connection is transmitted between IP-layer encryptors 106 and 110, the data is transmitted as only IP packets in ciphertext. Information related to the TCP connection is encrypted and not visible while the packet is transmitted in ciphertext. Hence, packets transmitted between the IP-layer encryptors 106 and 110 cannot benefit from any network devices within the Internet 108 that may enhance higher-level protocols such as TCP.

Furthermore, since IP packets operate at OSI layer 3, the end-to-end TCP connection 122 must ultimately handle any OSI layer 4 functionality (such as reliability and flow-control) for the ciphertext IP packets that are transmitted between IP-layer encryptors 106 and 110. In addition, the end-to-end TCP connection will be affected by any delays imposed by the presence of IP-layer encryptors.

Examples of IP-layer encryptors include IPSec and High Assurance Internet Protocol Encryptor (HAIPE). HAIPEs are IP-layer encryptors that conform to U.S. government standards and are primarily used by the government.

2. Performance Enhancing Proxy (Prior Art)

Figure 2:
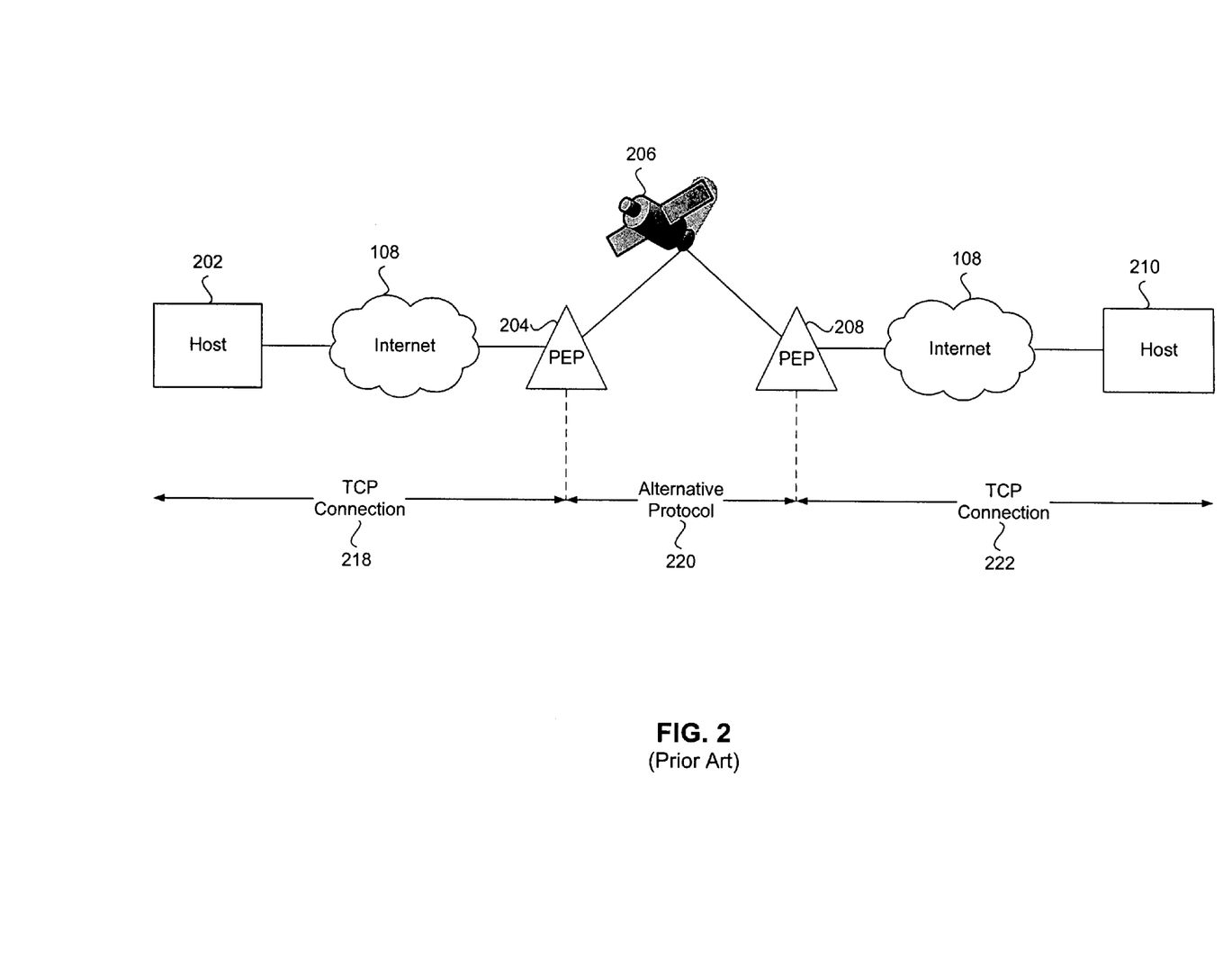
FIG. 2 is an exemplary illustration of a Performance Enhancing Proxy (PEP) deployed around a satellite link to enhance the performance of TCP connections passing through the satellite.

FIG. 2 is an exemplary illustration of a Performance Enhancing Proxy (PEP) deployed around a satellite link to enhance the performance of TCP connections across a satellite link. Hosts 202 and 210 are connected to the Internet 108. Packets may traverse between two different areas of the Internet 108 through satellite link 206. The satellite link 206 interfaces with the Internet 108 through PEPs 204 and 208.

When host 202 wishes to communicate with host 210, host 202 sends a packet to host 210 through the Internet 108. While the packet is traversing through the Internet 108, the packet may flow through PEP 204, satellite link 206, and PEP 208 before reaching host 210.

PEPs 204 and 208 are used to enhance performance of various transport protocols that may not operate well over the satellite link 206. For example, TCP is one protocol that is known not to operate well over satellite links. Satellite links are characterized by long delays and high bandwidths. Furthermore, losses of packets on satellite links are unlikely to be due to congestion. Since, TCP is not tuned for long delays and high bandwidths and makes an assumption that losses of packets are due to congestion, TCP does not perform well over satellite links. To mitigate these problems, PEPs 204 and 208 intercept a TCP connection and transport the data in the TCP connection over the satellite using an alternative protocol that is more suitable for satellite communications. Examples of an alternative protocol include the Space Communications Protocol Standards Transport Protocol (SCPS-TP) and the Xpress Transport Protocol (XTP).

PEPs 204 and 208 operate transparently to make end hosts 202 and 210 believe that they are communicating directly with each other over a single TCP connection. In actuality, PEPs 204 and 208 intercept and split the perceived single TCP connection into three connections. As indicated by labels 218 and 222, a TCP connection is employed between host 202 and PEP 204 and between host 210 and PEP 208. An alternative protocol that is more suitable for satellite links is used to transmit the data between PEPs 204 and 208 over the satellite link 206 as indicated by label 220. PEPs 204 and 208 coordinate activities, such as those related to OSI layer 4 functionality, between the two TCP connections 218 and 222 and the alternative protocol 220 to fool the two end hosts into believing that they are communicating to each other over a single TCP connection. Since the alternative protocol is more suitable than TCP for satellite links, the overall end-to-end performance experienced by the hosts 202 and 210 is enhanced compared to the performance the end hosts 202 and 210 would have experienced if the TCP connection was actually used across the satellite link 206.

Since PEPs enhance the performance of protocols at OSI layers 4-7, only packets that contain such information in an accessible format are candidates for the intended enhancements of the PEPs. If a packet does not contain protocol information relating to OSI layers 4-7 or if the PEPs do not support a particular OSI layer 4-7 protocol, the packets are passed across the challenged link (i.e., satellite link 206) normally and are not operated on by the PEPs.

Various different types of PEPs are described in the Internet Engineering Task Force Request for Comments (RFC) 3135, which is incorporated here by reference in its entirety. Most PEPs are designed to enhance the TCP protocol and generally need to manipulate TCP segments.

3. IP-layer Encryptors and PEPs (Prior Art)

Figure 3:
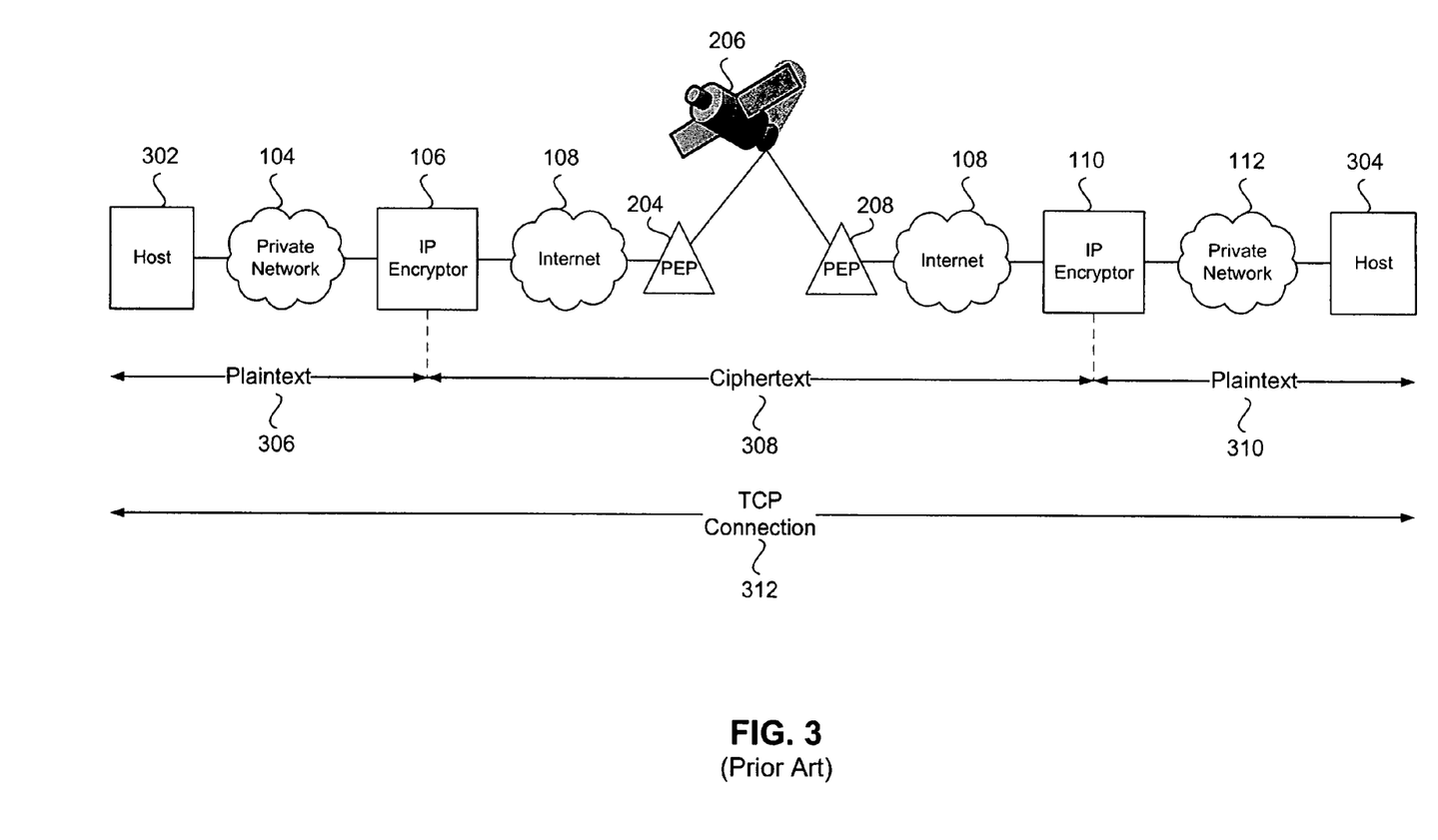
FIG. 3 is an exemplary illustration of a deployment of IP-layer encryptors and PEPs.

FIG. 3 is an exemplary illustration of a deployment of IP-layer encryptors and PEPs. Packets transmitted between hosts 302 and 304 pass through private networks 104 and 112, IP-layer encryptors 106 and 110, PEPs 204 and 208, satellite link 206, and the Internet 108. When host 302 attempts to establish a TCP connection to host 304 as indicated by label 312, host 302 transmits a plaintext TCP/IP packet destined for host 304. The plaintext TCP/IP packet travels through private network 104, becomes intercepted by the IP-layer encryptor 106, and is encrypted into a ciphertext IP packet in which all the information relating to the original TCP connection 312 (i.e., OSI layer 4 information) is made inaccessible. Hence, as the ciphertext IP packet traverses through the Internet 108 and arrives at PEP 204, the PEP 204 is unaware that the ciphertext IP packet is actually a part of the TCP connection 312 and passes it through to the satellite link 206 and PEP 208 without providing any enhancements for the TCP connection 312. The ciphertext IP packet eventually reaches IP-layer encryptor 110 and becomes decrypted and authenticated before it is sent through private network 112 and received by host 304 as a plaintext TCP/IP packet. Labels 306, 308 and 310 indicate the state in which a packet exists as it traverses between hosts 302 and 304.

As described above, since the IP-layer encryptors encrypt all the information related to OSI layers 4-7 of a packet and since PEPs require some information related to OSI layers 4-7 to provide enhancements, packets that become encrypted through an IP-layer encryptor cannot take advantage of any PEPs on the black-side or ciphertext side of the IP-layer encryptor. Since, ciphertext IP packets operate only at OSI layer 3, OSI layer 4 functionality for the ciphertext IP packets will ultimately be provided by the TCP connection 312 that is maintained by the end hosts 302 and 304. Since TCP operates poorly over satellite link 206 and no enhancements are provided by PEPs 204 and 206 for the TCP connection 312, the end hosts 302 and 304 will experience a performance degradation. End-to-end performance at hosts 302 and 304 can be improved if packets originating from these hosts on the red-side of the IP-layer encryptors 106 and 110 can take advantage of PEPs 204 and 208 while their packets are traveling through the black-side of the IP-layer encryptors.

4. A Solution for Utilizing PEPs with IP-layer Encryptors

Figure 4:
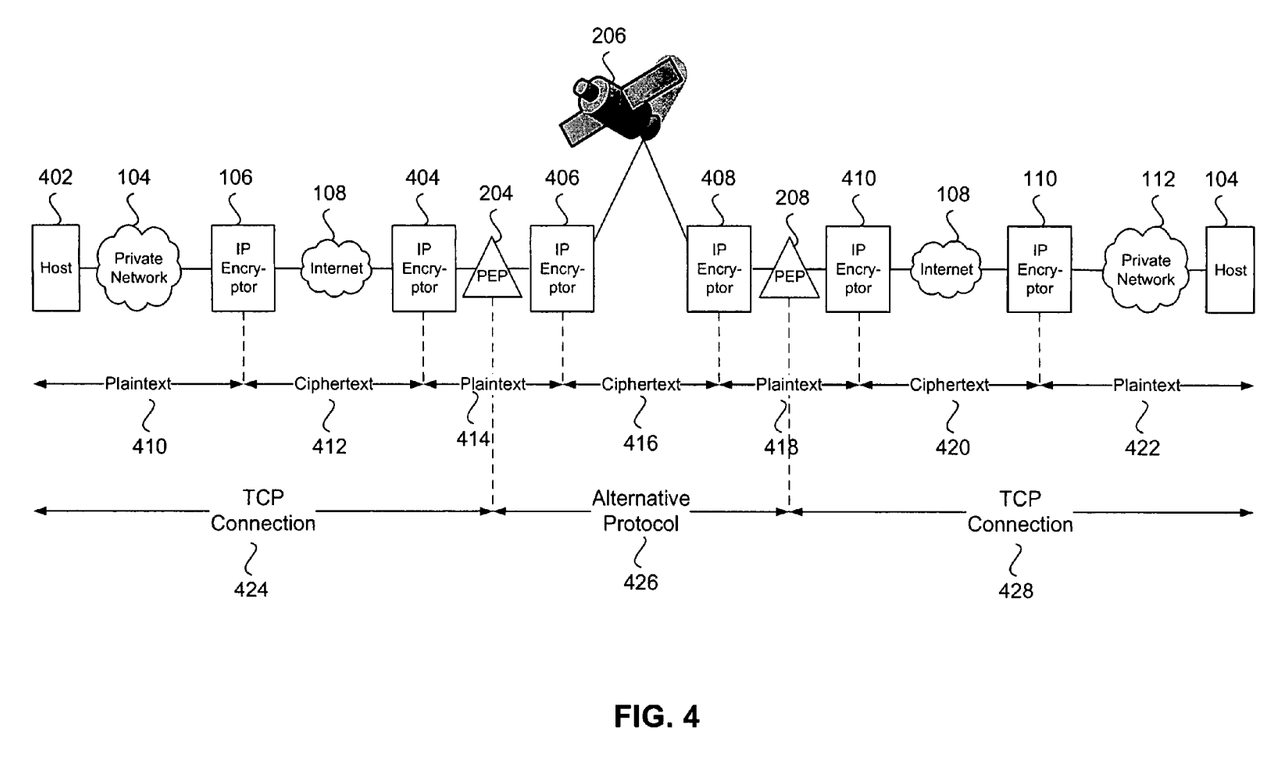
FIG. 4 is an exemplary illustration of a solution employed to utilize PEPs with IP-layer encryptors.

FIG. 4 is an exemplary illustration of a solution employed to utilize PEPs with IP-layer encryptors. The solution deploys IP-layer encryptors around PEPs to ensure that PEPs are always on the red-side of IP-layer encryptors and operating on plaintext packets. As depicted in FIG. 4, IP-layer encryptors 404, 406, 408, and 410 are deployed to ensure that PEPs 204 and 208 are operating on plaintext packets. Since previously encrypted packets are presented to PEPs 204 and 208 as plaintext packets, PEPs 204 and 208 can access higher-level protocol information (i.e., OSI layers 4-7) in the packets and provide enhancements where applicable.

As depicted in FIG. 4, PEPs 204 and 208 can intercept a TCP connection between hosts 402 and 404 once it has been decrypted by IP-layer encryptors 404, 406, 408, and 410 to provide enhancements over the satellite link 206. Data is transmitted between host 402 and PEP 204 and between host 404 and PEP 208 using a TCP connection as indicated by labels 424 and 428 and data is transmitted between PEPs 204 and 208 using an alternative protocol as indicated by label 426.

Deploying IP-layer encryptors around PEPs essentially makes the PEPs a part of the private or secure network. Labels 410, 412, 414, 416, 418, 420 and 422 indicate the state in which a packet (i.e., plaintext or ciphertxt) exists as it is transmitted between hosts 402 and 404.

A solution as depicted in FIG. 4 is unappealing because it requires additional IP-layer encryptors than the systems shown in FIG. 3. Adding more IP-layer encryptors places additional overhead in the end-to-end performance experienced by the end hosts. Furthermore, it may not be feasible to place IP-layer encryptors around all the PEPs, especially ones deployed by third parties, due to high costs, concerns that third party PEPs and third party networks are insecure for plaintext data, or concerns that IP-layer encryptors themselves need to be physically protected. Hence, a better solution is needed to allow PEPs to operate in an environment that includes IP-layer encryptors.

Figure 5:
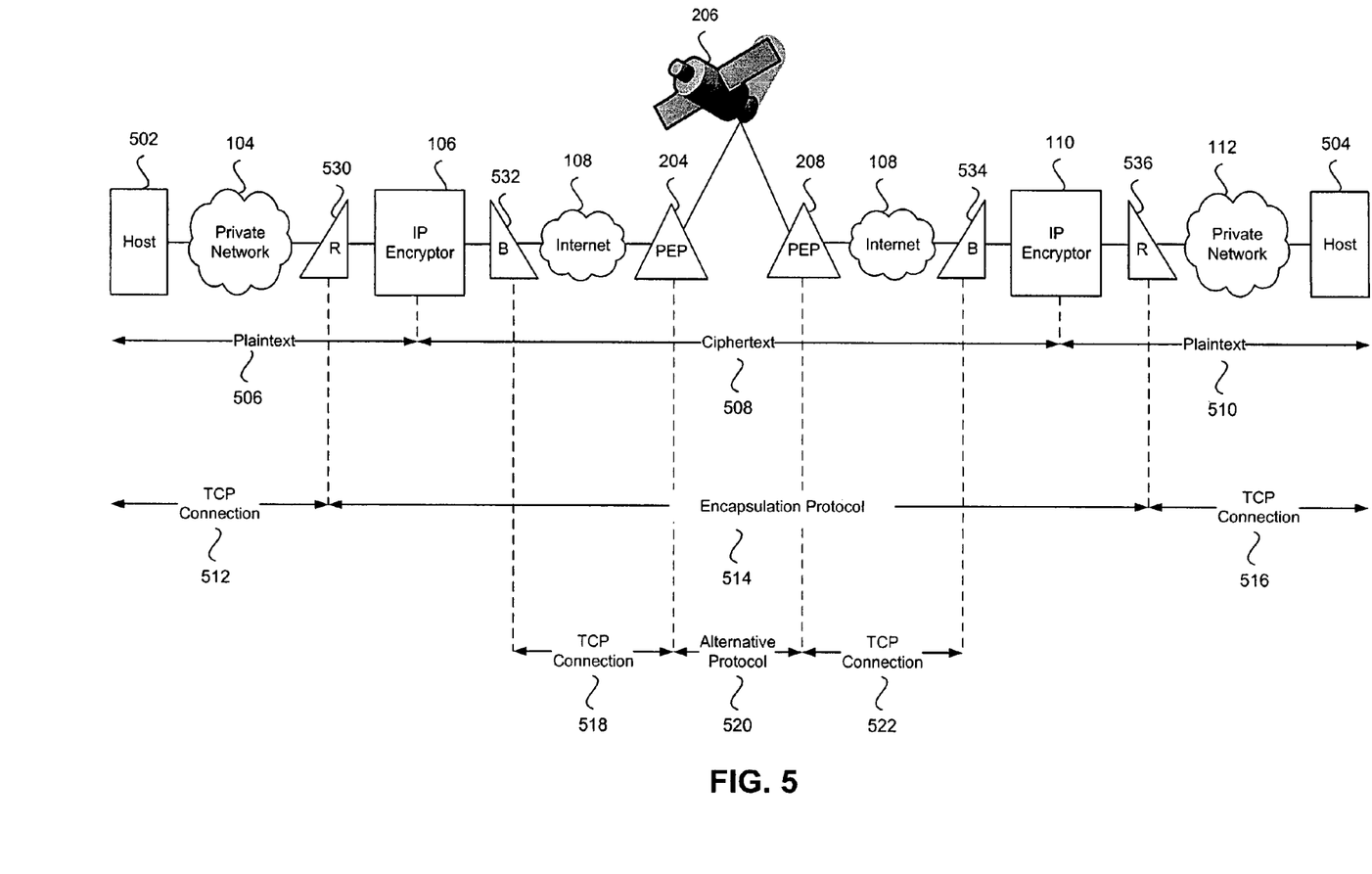
FIG. 5 depicts an embodiment of the present invention to allow PEPs on the black-side of an IP-layer encryptor to be utilized.

5. Split Performance Enhancing Proxy Enabler (PEPE): an Embodiment of the Present Invention FIG. 5 depicts an embodiment of the present invention to allow PEPs on the black-side of an IP-layer encryptor to be utilized. Packets transmitted between hosts 502 and 504 travel through private networks 104 and 112, red-side Performance Enhancing Proxy Enablers (PEPEs) 530 and 536, IP-layer encryptors 106 and 110, black-side PEPEs 532 and 536, the Internet 108, PEPs 204 and 208, and satellite link 206.

Red-side PEPE 530 and black-side PEPE 532 work together to form a single Split Performance Enhancing Proxy Enabler (SPEPE). In one embodiment, red-side PEPE 530 and black-side PEPE 532 operate within a single common processor. In another embodiment, PEPE 530 and PEPE 532 are on separate processors. Likewise, red-side PEPE 536 and black-side PEPE 534 work together as a single SPEPE. Performance Enhancing Proxy Enablers allow PEPs 204 and 208 on the black-side of IP-layer encryptors 106 and 110 to be utilized by hosts 502 and 504 on the red-side of the IP-layer encryptors.

PEPEs operate transparently to end hosts 502 and 504. Hence, hosts 502 and 504 are made to believe that they are communicating directly with each other over a single TCP connection. In reality, data transmitted between end hosts 502 and 504 over the perceived single TCP connection is transported over several different connections. Red-side PEPEs 530 and 536 intercept the desired TCP connection between end hosts 502 and 504 and terminate the desired TCP connection to produce two TCP connections 512 and 516 between the end host 502 and red-side PEPE 530 and between end host 504 and red-side PEPE 536. Between the two red-side PEPEs 530 and 536, an encapsulation protocol 514 is used to transport the data received on TCP connections 512 and 516.

In order provide end hosts 502 and 504 with the illusion that they are communicating over a single TCP connection, the red-side PEPEs 530 and 536 must coordinate the activities of the two TCP connections 512 and 516 and the encapsulation protocol 514. Such coordination may involve, for example, providing OSI layer 4 functionality (i.e., flow-control, reliability, etc) in the encapsulation protocol. For example, red-side PEPEs 530 and 536 may encapsulate the data received in TCP connections 512 and 516 into UDP packets and transmit them between the two red-side PEPEs. When UDP packets are used, a basic NACK (negative acknowledgement) oriented retransmission scheme can be used to provide reliability. As would be appreciated by one skilled in the relevant art, different encapsulation schemes as well as different schemes for reliability may be utilized.

By breaking up the single TCP connection that is perceived by end hosts 502 and 504, red-side PEPEs can tune OSI layer 4 functionality for each leg of the perceived single TCP connection. For example, each leg of the perceived single TCP connection may utilize different window size limitations and packet losses in one leg may be insulated from the other legs. As would be appreciated by one skilled in the relevant art, red-side PEPEs may be used to partition other higher-level protocols (i.e., OSI layers 4-7) than TCP.

Black-side PEPEs 532 and 536 provide mechanisms to receive IP packets (OSI layer 3 packets) and transmit them between black-side PEPEs using a higher-level protocol (i.e., OSI layers 4-7) such as TCP. Hence, black-side PEPEs can take advantage of PEPs that exist between them. As depicted in FIG. 5, black-side PEPEs 532 and 534 believe that they are communicating directly with each other over a single TCP connection. In actuality, PEPs 204 and 208 have transparently intercepted the desired TCP connection between the two black-side PEPEs 532 and 534 to enhance the connection over the challenged satellite link 206. As described above in section 2 describing PEPs, enhancements to the desired TCP connection over the satellite link 206 is provided by breaking up the desired TCP connection into two TCP connections 518 and 522 and transmitting the data over the satellite link using an alternative protocol 520.

By placing a red-side PEPE and a black-side PEPE around each IP-layer encryptor, connections originating from the red-side of the IP-layer encryptors can effectively take advantage of any PEPs that may exist between them. Red-side PEPEs partition higher-level protocol functionality (OSI layer 4-7) utilized by the end hosts so that red-side PEPEs can tune end hosts performance when another higher-level protocol is used between the red-side PEPEs (such as those used by the black-side PEPEs). Black-side PEPEs provide a mechanism to transmit ciphertext IP packets (OSI layer 3) produced by the IP-layer encryptors using a higher-level protocol. Hence, higher-level protocol packets originating from hosts 502 and 504 as plaintext plackets 506 and 510 on the red-side of IP-layer encryptors can take advantage of PEPs 204 and 208 after they have been converted to ciphertext packets 508 by IP-layer encryptors 106 and 110.

Additional coordination can be applied between a red-side PEPE and a black-side PEPE peer to provide additional features, flexibility and efficiency. For example, for red-side packets that are unlikely to benefit from PEPs, the red-side PEPE can choose not to encapsulate them and instruct the black-side PEPE to not transmit them using a higher-level protocol. By allowing such coordination between a red-side PEPE and a black-side PEPE, the resources utilized by the PEPEs can be limited to those packets that would benefit from the operation of black-side PEPs.

To enable this functionality, some information in a red-side packet must pass through as plaintext when an IP-layer encryptor converts a red-side packet into a black-side ciphertext packet. For example, a flag may be placed on the red-side packet to signal the IP-layer encryptor to include the same or corresponding flag in the black-side packet it generates. A red-side PEPE can use such a flag to signal the black-side PEPE that a black-side ciphertext packet was originally encapsulated by the red-side PEPE. Based on the flag, the black-side PEPE can decide whether to let the ciphertext packet pass through the network normally or to transport the ciphertext packet using a higher-level protocol such as TCP.

Furthermore, by providing a mechanism for a black-side PEPE to signal its red-side PEPE peer that a remote PEPE is unavailable, the red-side PEPE can discontinue encapsulating packets that are addressed to the same destination. Hence, where packets are destined for parts of the network where no PEPEs exist, those packets are transmitted through the network unaffected by PEPEs. This functionality allows for incremental deployment of PEPEs since PEPEs can automatically detect whether a remote IP-layer encryptor is supported by a PEPE and act accordingly.

A black-side PEPE can determine if a PEPE exists at the destination, for example, by attempting to make a TCP connection to the destination IP-layer encryptor. If a black-side PEPE is available at the destination IP-layer encryptor, it will intercept and establish the TCP connection. If a black-side PEPE is unavailable at the destination IP-layer encryptor, the TCP connection will fail since the destination IP-layer encryptor is unlikely to accept the TCP connection. As would be appreciated by one skilled in the relevant art, other techniques of detecting the presence of a remote system or process can be utilized to detect if a PEPE exists at a remote destination. Once a black-side PEPE determines that a PEPE does not exist at the destination, the black-side PEPE can pass that information to its red-side PEPE peer so that the red-side PEPE will no longer encapsulate packets addressed to the same destination.

In order for a SPEPE that is installed around a single IP-layer encryptor to coordinate, there must be some mechanism to allow red-side and black-side PEPEs to exchange information without having the information be encrypted or decrypted by the IP-layer encryptor. In essence, some bypass mechanism must exist so that the coordinating information transmitted between the red-side and black-side PEPEs are not altered by the encryption and decryption normally performed by the IP-layer encryptor. The bypass mechanism may be supported directly by the IP-layer encryptor or a channel completely separate from the IP-layer encryptor may be used by the red-side and black-side PEPEs.

If flow control information is permitted to pass through the IP-layer encryptor between a red-side PEPE and black-side PEPE peer, the PEPEs can provide better higher-level OSI functionality (i.e., reliability, congestion control, etc). For example, such flow control information may be used by a black-side PEPE to slow down its red-side PEPE peer when the black-side PEPE is being overwhelmed. Managing the flow between the red-side and black-side PEPE in this manner allows less packets to be lost to congestion. Therefore, by allowing the red-side and black-side PEPEs to share flow control information through the IP-layer encryptor, overall throughput and latency may be improved and end-to-end retransmissions in the encapsulation protocol may be minimized.

Furthermore, by passing flow-id information between a red-side PEPE and a black-side PEPE peer, the black-side PEPE can distinguish separate flows to the same destination and transmit packets for each flow separately to improve performance. If no flow-id information is made available between the red-side PEPE and the black-side PEPE peer, all flows destined for a particular destination must be multiplexed over a single connection between two black-side PEPEs. Such multiplexing may lead to head-of-line blocking where a loss in one flow delays the delivery of other flows. For example, in TCP, data received out of sequence cannot be delivered until the earlier data in the sequence is received. Hence, where PEPEs use TCP to communicate with each other on the black-side, if there is a loss of a packet for one flow, all other flows may be forced to wait until the loss is recovered. To minimize or remove this potential inefficiency, PEPEs can utilize multiple TCP connections to each other to transport data on the black-side. When flow-id information is available from the red-side PEPE to its black-side PEPE peer, the black-side PEPE can create a separate TCP connection to the remote PEPE for each separate flow and therefore eliminate head-of-line blocking that may result from multiplexing multiple flows.

When various features as described above are implemented in red-side PEPEs 530 and 536 and black-side PEPEs 532 and 534, a TCP connection that that is initiated by host 502 to host 504 in FIG. 5 may be handled in the following exemplary manner.

1. Red-side PEPE 530 intercepts the SYN packet sent by host 502 to initiate the TCP connection.

2. Red-side PEPE 530 waits to respond to host 502 with a SYN-ACK until host 504 is ultimately contacted.

3. The SYN packet is cached by the red-side PEP 530 until it receives confirmation that remote PEPEs 534 and 536 exist.

4. Red-side PEPE 530 creates a UDP/IP packet containing a flag indicating that the UDP packet contains encapsulated TCP data, a flow-id for the new TCP connection, the initial window size information about host 502 along with other information to encapsulate the TCP connection (i.e., IP addresses, ports, initial sequence number (ISN), etc) and addresses the UDP packet to host 504 at a port that is well known for the red-side PEPE 536.

5. Red-side PEPE 530 forwards the UDP/IP packet to IP-layer encryptor 106. The IP-layer encryptor 106 encrypts all the information in the UDP/IP packet except for the encapsulation flag, flow-id, and initial window size information to produce a new ciphertext IP packet with IP-layer encryptor 110 as the destination address.

6. Black-side PEPE 532 intercepts the ciphertext IP packet and verifies that the encapsulation flag is set, examines the flow-id, notes the new flow-id, and creates a new TCP connection to IP-layer encryptor 110 with IP-layer encryptor 106 as the source address and transmits the ciphertext IP packet to IP-layer encryptor 110.

7. PEPs 204 and 206 transparently intercept the TCP connection initiated by black-side PEPE 534 and use an alternative protocol for transmission across the satellite link 206.

8. Black-side PEPE 534 intercepts the TCP connection initiated from the black-side PEPE 532 to IP-layer encryptor 110, extracts the ciphertext IP packet and forwards it to IP-layer encryptor 110.

9. IP-layer encryptor 110 decrypts the ciphertext IP packet into the encapsulated UDP packet and forwards it to host 504.

10. Red-side PEPE 536 intercepts the UDP packet, extracts flow-id, and other encapsulated information for the TCP connection initiated by host 502 (i.e., ports, addresses, initial sequence number (ISN), etc) and creates a TCP connection to host 502 using the encapsulated information.

11. Once a TCP connection is established between red-side PEPE 536 and host 504, an acknowledgement is sent back to red-side PEPE 530 using the TCP connection between black-side PEPEs 532 and 534 created for the new flow-id.

12. Once the acknowledgement is received by red-side PEPE 530, a SYN-ACK is sent to host 502 to indicate that a connection has been successfully established to host 504 and data transfer between the two hosts can begin.

In the above exemplary description of a TCP connection being initiated, if a red-side PEPE 536 is not present, the encapsulated UDP packet will be delivered to host 504 at a port specified for red-side PEPE 536. Since host 504 should not be accepting UDP packets at a port designated for a red-side PEPE, host 504 will send a response back to the originator of the UDP packet (red-side PEPE 530) to indicate that the port is unreachable. Upon being notified that red-side PEPE 536 is not reachable, red-side PEPE 530 will no longer encapsulate packets destined for host 504 and allow those packets to pass unaffected through red-side PEPE 530 and black-side PEPE 532. Likewise, if the black-side PEPE 532 was unable to initiate a TCP connection with black-side PEPE 534, the failure will be reported back to red-side PEPE 530 through a bypass mechanism in IP-layer encryptor 106 and red-side PEPE 530 will no longer encapsulate packets destined for host 504.

When various features as described above are implemented in red-side PEPEs 530 and 536 and black-side PEPEs 532 and 534, a TCP connection that that is torn down between host 502 and host 504 in FIG. 5 may be handled in the following exemplary manner.

1. Red-side PEPEs 530 and 536 convey FIN information to tear down TCP connections between the red-side PEPEs 530 and 536 and hosts 502 and 504.

2. Black-side PEPEs 532 and 534 uses soft-state-based timeout to initiate a tear down. When black-side PEPEs 532 and 534 receive new data to be transmitted and the TCP connection for the flow-id of the data is not available, a new TCP connection for the flow-id is created to reinstate the session.

To provide the described functionality of the present invention, a red-side PEPE and a black-side PEPE are installed around an IP-layer encryptor. The red-side PEPE, black-side PEPE, and the IP-layer encryptor may be installed together on a single computer or separately on multiple computers. When installed on separate computers, it is preferable to locate the red-side PEPE and black-side PEPE close to the IP-layer encryptor to minimize latency and to provide a higher level of security if the IP-layer encryptor permits information to be bypassed between the red-side and black-side PEPE without encryption or decryption.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

6. Example of a Computer that can be Used to Operate the Present Invention

Figure 6:
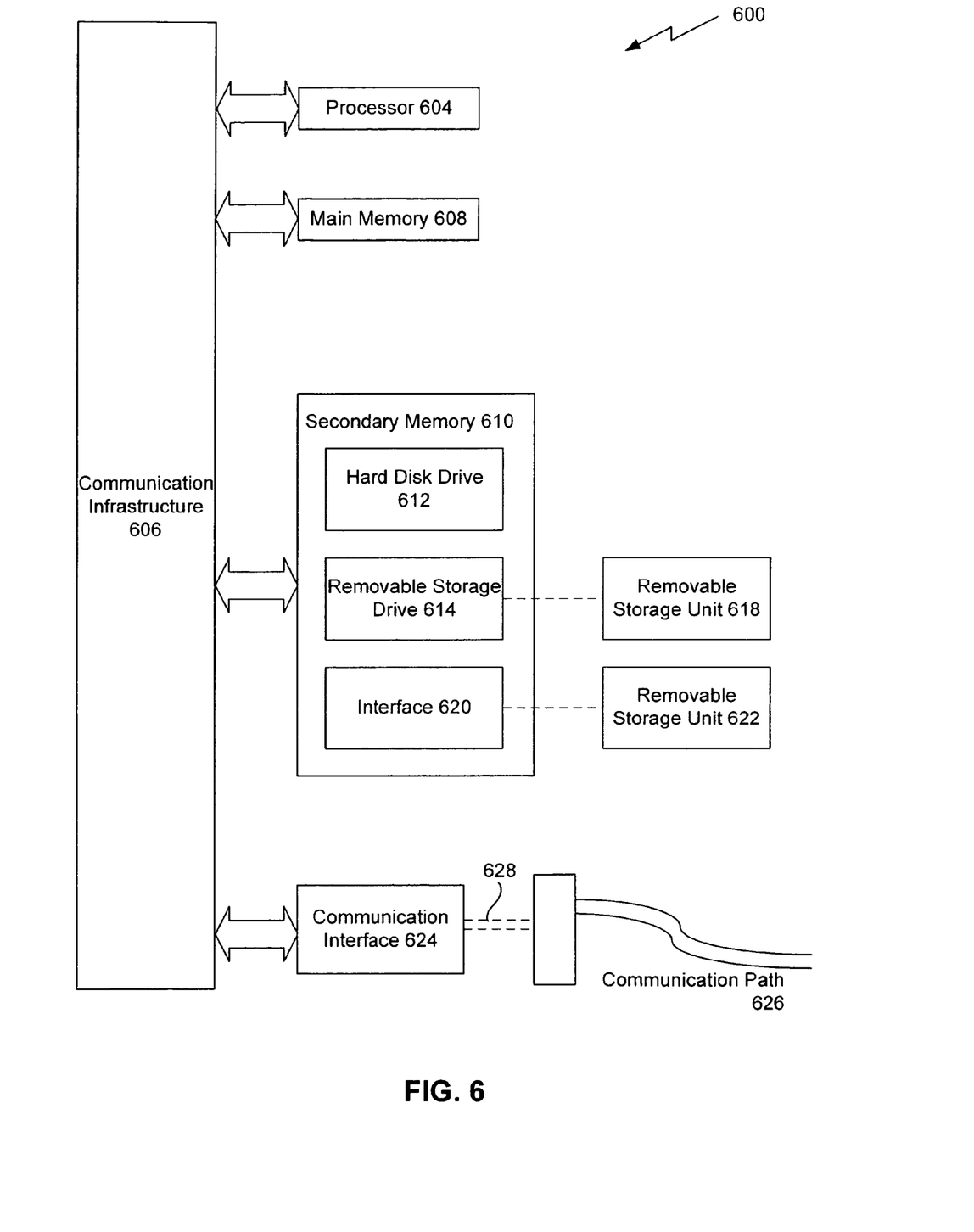
FIG. 6 illustrates an example computer system in which the present invention may be implemented as programmable code.

FIG. 6 illustrates an example computer system 600, in which the present invention may be implemented as programmable code. Various embodiments of the invention are described in terms of this example computer system 600. After reading this description, it will become apparent to a person skilled in the art how to implement the invention using other computer systems and/or computer architectures.

Computer system 600 includes one or more processors, such as processor 604. Processor 604 may be any type of processor, including but not limited to a special purpose or a general purpose digital signal processor. Processor 604 is connected to a communication infrastructure 606 (for example, a bus or network). Various software implementations are described in terms of this exemplary computer system. After reading this description, it will become apparent to a person skilled in the art how to implement the invention using other computer systems and/or computer architectures.

Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 618 in a well known manner. Removable storage unit 618 represents a floppy disk, magnetic tape, optical disk, etc., which is read by and written to by removable storage drive 614. As will be appreciated, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from removable storage unit 622 to computer system 600.

Computer system 600 may also include a communication interface 624. Communication interface 624 allows software and data to be transferred between computer system 600 and external devices. Examples of communication interface 624 may include a modem, a network interface (such as an Ethernet card), a communication port, a Personal Computer Memory Card International Association (PCMCIA) slot and card, etc. Software and data transferred via communication interface 624 are in the form of signals 628 which may be electronic, electromagnetic, optical, or other signals capable of being received by communication interface 624. These signals 628 are provided to communication interface 624 via a communication path 626. Communication path 626 carries signals 628 and may be implemented using wire or cable, fiber optics, a phone line, a cellular phone link, a radio frequency link, or any other suitable communication channel. For instance, communication path 626 may be implemented using a combination of channels.

In this document, the terms "computer program medium" and "computer usable medium" are used generally to refer to media such as removable storage drive 614 and a hard disk installed in hard disk drive 612. These computer program products are means for providing software to computer system 600.

Computer programs (also called computer control logic) are stored in main memory 608 and/or secondary memory 610. Computer programs may also be received via communication interface 624. Such computer programs, when executed, enable computer system 600 to implement the present invention as discussed herein. Accordingly, such computer programs represent controllers of computer system 600. Where the invention is implemented using software, the software may be stored in a computer program product and loaded into computer system 600 using removable storage drive 614, hard disk drive 612, or communication interface 624, to provide some examples.

In alternative embodiments, the invention can be implemented as control logic in hardware, firmware, or software or any combination thereof.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for allowing a red-side of an IP-layer encryptor to utilize the benefits of a performance enhancing proxy located on a black-side of the IP-layer encryptor, comprising:
an IP-layer encryptor, wherein the IP-layer encryptor transforms IP packets between a red-side and a black-side, wherein IP packets received from the red-side are encrypted and output to the black-side, and wherein IP packets received from the black-side are decrypted and output to the red-side;
a first enabler disposed on the red-side of the IP-layer encryptor; and
a second enabler disposed on the black-side of the IP-layer encryptor;
wherein the first enabler receives a first packet of a first higher-level protocol, creates a second packet of an encapsulation protocol, encapsulates higher-level protocol connection information and payload from the first packet into the second packet, outputs the second packet, and notifies the second enabler that the second packet contains encapsulated first higher-level protocol data;
wherein the IP-layer encryptor receives the second packet from the red-side, encrypts the payload from the second packet into a first IP packet, stores the higher-level protocol connection information from the second packet into the first IP packet, and outputs the first IP packet to the black-side; and
wherein the second enabler receives the first IP packet, encapsulates the first IP packet in a third packet of a second higher-level protocol responsive to the notification from the first enabler, and sets higher-level protocol connection information of the third packet based on the higher-level protocol connection information from the second packet stored in the first IP packet.

2. The system of claim 1, wherein the second enabler receives a fourth packet of the second higher-level protocol, converts the fourth packet to a second IP packet, and outputs the second IP packet;
wherein the IP-layer encryptor receives the second IP packet from the black-side, decrypts the second IP packet into a fifth packet of the encapsulation protocol, and outputs the fifth packet to the red-side; and
wherein the first enabler receives the fifth packet and converts the fifth packet to a sixth packet of the first higher-level protocol.

3. The system of claim 2, wherein the first enabler identifies encapsulated higher-level protocol connection information and payload from the fifth packet and incorporates the identified encapsulated higher-level protocol connection information and payload into the sixth packet.

4. The system of claim 3, wherein the first enabler upon receiving the fifth packet, examines the identified encapsulated higher-level protocol connection information, determines if a seventh packet of the encapsulation protocol is missing, and requests the sender of the fifth packet to retransmit the seventh packet.

5. The system of claim 1, wherein the first enabler notifies the second enabler that the second packet contains encapsulated first higher-level protocol data by including a first flag in the second packet to direct the second enabler to operate on the first IP packet, wherein the IP-layer encryptor includes a second flag in the first IP packet if a the first flag exists in the second packet, and wherein the second enabler encapsulates the first IP packet in the third packet only if the second flag exists in the first IP packet.

6. The system of claim 5, wherein the second enabler detects that the third packet is undeliverable because a connection utilizing the second higher-level protocol cannot be established to the destination of the third packet, wherein the second enabler communicates with the first enabler to indicate that any packets of the first higher-level protocol that the first enabler receives that are destined for the same destination as the first packet should not be encapsulated in packets of the encapsulation protocol.

7. The system of claim 1, wherein the first enabler includes a flow-id in the second packet to inform the second enabler that the first IP packet belongs to a flow identified by the flow-id, wherein the IP-layer encryptor includes the flow-id in the first IP packet if the flow-id exists in the second packet, wherein the second enabler encapsulates the first IP packet in the third packet such that the third packet is associated with a connection for a flow identified by the flow-id.

8. The system of claim 2, wherein the first enabler and the second enabler transmit and receive information to each other through the IP-layer encryptor to manage flow control between the first enabler and the second enabler.

9. The system of claim 2, wherein the first enabler and the second enabler transmit and receive information to each other without utilizing the IP-layer encryptor to manage flow control between the first enabler and the second enabler.

10. The system of claim 2, wherein the first higher-level protocol is one of TCP and SCTP, the second higher-level protocol is one of TCP and SCTP and the encapsulation protocol is UDP.

11. A method for allowing the plaintext side of an IP-layer encryptor to utilize the benefits of a performance enhancing proxy located on a cyphertext side of the IP-layer encryptor comprising:
receiving a first packet of a first higher-level protocol;
creating a second packet of an encapsulation protocol;
encapsulating higher-level protocol connection information and payload from the first packet into the second packet;
sending the second packet, along with a notification that the second packet contains encapsulated first higher-level protocol data, to an P-layer encryptor, wherein the IP-layer encryptor encrypts the payload from the second packet into a first IP packet and stores the higher-level protocol connection information from the second packet into the first IP packet;
receiving the first IP packet and the notification;
encapsulating the first IP packet in a third packet of a second higher-level protocol responsive to receipt of the notification; and
setting higher-level protocol connection information of the third packet based on the higher-level protocol connection information from the second packet stored in the first IP packet.

12. The method of claim 11, further comprising the steps of:
receiving a fourth packet of the second higher-level protocol;
converting the fourth packet to a second IP packet;
sending the second IP packet to the IP-layer encryptor, wherein the IP-layer encryptor converts the second IP packet into a fifth packet of the encapsulation protocol;
receiving the fifth packet; and
converting the fifth packet to a sixth packet of the first higher-level protocol.

13. The method of claim 12, wherein the step of convening the fifth packet to a sixth packet comprises the steps of:

identifying encapsulated higher-level protocol connection information and payload from the fifth packet; and
incorporating the identified encapsulated higher-level protocol information and payload into the sixth packet.

14. The method of claim 13, wherein the step of converting the fifth packet to a sixth packet further comprises the steps of:
determining if a seventh packet of the encapsulation protocol is missing by examining the identified encapsulated higher-level protocol information; and
requesting the sender of the fifth packet to retransmit the seventh packet.

15. The method of claim 11, wherein the step of sending the second packet, along with a notification that the second packet contains encapsulated first higher-level protocol data, to an IP-layer encryptor comprises the step of:
including the notification as a first flag in the second packet, wherein the IP-layer encryptor will include a second flag in the first IP packet if a first flag exists in the second packet; and
wherein the step of encapsulating the first IP packet in the third packet comprises the step of encapsulating the first IP packet in the third packet only if the first IP packet contains the second flag.

16. The method of claim 15, wherein the step of encapsulating the first IP packet in the third packet further comprises:
detecting if the third packet is undeliverable because a connection utilizing the second higher-level protocol cannot be established to the destination of the third packet; and
indicating that the any packets of the first higher-level protocol destined for the same destination as the first packet should not be encapsulated in packets of the encapsulation protocol.

17. The method of claim 11, wherein the step of encapsulating higher-level protocol connection information and payload from the first packet into the second packet comprises the step of:
including a flow-id in the second packet, wherein the IP-layer encryptor will include the flow-id in the first IP packet; and
wherein the step of encapsulating the first IP packet in the third packet comprises the step of:
associating the third packet with a connection for a flow identified by the flow-id.

18. The method of claim 12, further comprising the step of:
transmitting and receiving information to manage the rate at which encapsulation protocol packets are sent to the IP-layer encryptor.

19. The method of claim 12, further comprising the step of:
transmitting and receiving information without utilizing the IP-layer encryptor to manage the rate at which encapsulation protocol packets are sent to the IP-layer encryptor.

20. The method of claim 12, wherein the first higher-level protocol is one of TCP and SCTP, the second higher-level protocol is one of TCP and SCTP, and the encapsulation protocol is UDP.

21. A computer-usable medium having instructions stored thereon that, when executed by a computing device, cause the computing device to perform functions comprising:
receiving a first packet of a first higher-level protocol;
creating a second packet of an encapsulation protocol;
encapsulating higher-level protocol connection information and payload from the first packet into the second packet;

sending the second packet, along with a notification that the second packet contains encapsulated first higher-level protocol data, to an IP-layer encryptor, wherein the IP-layer encryptor encrypts the payload from the second packet into a first IP packet and stores the higher-level protocol connection information from the second packet into the first IP packet;

receiving the first IP packet and the notification;

encapsulating the first IP packet in a third packet of a second higher-level protocol responsive to receipt of the notification; and setting higher-level protocol connection information of the third packet based on the higher-level protocol connection information from the second packet stored in the first IP packet.

22. The computer-usable medium of claim 21, the functions further comprising:

receiving a fourth packet of the second higher-level protocol;

converting the fourth packet to a second IP packet;

sending the second IP packet to the IP-layer encryptor, wherein the IP-layer encryptor converts the second IP packet into a fifth packet of the encapsulation protocol;

receiving the fifth packet; and converting the fifth packet to a sixth packet of the first higher-level protocol.

23. The computer-usable medium of claim 22, wherein converting the fifth packet to the sixth packet comprises:

identifying encapsulated higher-level protocol connection information and payload from the fifth packet; and incorporating the identified encapsulated higher-level protocol information and payload into the sixth packet.

24. The computer-usable medium of claim 23, wherein converting the fifth packet to the sixth packet further comprises:

determining if a seventh packet of the encapsulation protocol is missing by examining the identified encapsulated higher-level protocol information; and requesting the sender of the fifth packet to retransmit the seventh packet.

25. The computer-usable medium of claim 21, wherein sending the second packet, along with a notification that the second packet contains encapsulated first higher-level protocol data, to an IP-layer encryptor comprises:

including the notification as a first flag in the second packet, wherein the IP-layer encryptor will include a second flag in the first IP packet if a first flag exists in the second packet, wherein encapsulating the first IP packet in the third packet comprises encapsulating the first IP packet in the third packet only if the first IP packet contains the second flag.

26. The computer-usable medium of claim 25, wherein encapsulating the first IP packet in the third packet further comprises:

detecting if the third packet is undeliverable because a connection utilizing the second higher-level protocol cannot be established to the destination of the third packet; and indicating that the any packets of the first higher-level protocol destined for the same destination as the first packet should not be encapsulated in packets of the encapsulation protocol.

27. The computer-usable medium of claim 21, wherein encapsulating higher-level protocol connection information and payload from the first packet into the second packet comprises:

including a flow-id in the second packet, wherein the IP-layer encryptor will include the flow-id in the first IP packet, wherein encapsulating the first IP packet in the third packet comprises associating the third packet with a connection for a flow identified by the flow-id.

28. The computer-usable medium of claim 22, the method functions further comprising:

transmitting and receiving information to manage the rate at which encapsulation protocol packets are sent to the IP-layer encryptor.

29. The computer-usable medium of claim 22, the functions further comprising:

transmitting and receiving information without utilizing the IP-layer encryptor to manage the rate at which encapsulation protocol packets are sent to the IP-layer encryptor.

30. The computer-usable medium of claim 22, wherein the first higher-level protocol is one of TCP and SCTP, the second higher-level protocol is one of TCP and SCTP, and the encapsulation protocol is UDP.

* * * * *

UNITED STATES PATENT AND TRADEMARK OFFICE
CERTIFICATE OF CORRECTION

PATENT NO. : 7,684,414 B2 Page 1 of 1
APPLICATION NO. : 11/359541
DATED : March 23, 2010
INVENTOR(S) : Robert C. Durst It is certified that error appears in the above-identified patent and that said Letters Patent is hereby corrected as shown below:

In column 15, line 66, Claim 13 please replace "convening" with --converting--.

In column 17, line 20, Claim 22 please replace "convening" with --converting--.

Signed and Sealed this

Fifteenth Day of June, 2010

David J. Kappos
*Director of the United States Patent and Trademark Office*